United States Patent [19]

Judith et al.

[11] 3,964,884
[45] June 22, 1976

[54] MEANS AND METHOD FOR SEPARATION OF WATER FROM STEAM-WATER MIXTURE

[75] Inventors: Hans Jüdith; Otto A. von Schwerdtner, both of Mulheim (Ruhr), Germany

[73] Assignee: Kraftwerk Union Aktiengesellschaft, Mulheim (Ruhr), Germany

[22] Filed: Oct. 22, 1974

[21] Appl. No.: 516,901

[30] Foreign Application Priority Data
Oct. 23, 1973 Germany............................ 2353111

[52] U.S. Cl. .................................... 55/184; 55/192; 55/203; 55/340; 55/457
[51] Int. Cl.² ........................................ B01D 19/00
[58] Field of Search ............................ 55/39–41, 55/48–52, 184–192, 199, 203, 338–340, 440, 456, 457, 462

[56] References Cited
UNITED STATES PATENTS

| | | | |
|---|---|---|---|
| 1,007,289 | 10/1911 | Jeffreys............................ | 55/440 X |
| 1,896,896 | 2/1933 | Hawley............................ | 55/DIG. 22 |
| 2,216,389 | 10/1940 | Hawley............................ | 55/440 X |
| 2,393,112 | 1/1946 | Lincoln............................ | 55/340 |
| 3,670,479 | 6/1972 | Tomlinson........................ | 55/457 X |
| 3,788,282 | 1/1974 | Modrak et al. .................. | 55/DIG. 23 X |

FOREIGN PATENTS OR APPLICATIONS 757,424 9/1956 United Kingdom............... 55/340 X Primary Examiner—Charles N. Hart
Assistant Examiner—Richard W. Burks
Attorney, Agent, or Firm—Herbert L. Lerner

[57] ABSTRACT

Means for separation of water in the connecting duct of a saturated steam turbine. A spin generator with guide blades is built directly into the duct. Downstream behind the spin generator, there are provided annular openings in the connecting duct for removal of the water to surrounding water receiving chambers. The water receiving chambers are connected by a steam suction pipe to a zone of lower pressure in the central flow portion of the spin generator. A water vapor agglomerator is located in a bent section of the duct before the spin generator and consists of directional baffles. The water is first agglomerated and then spun out.

1 Claim, 1 Drawing Figure

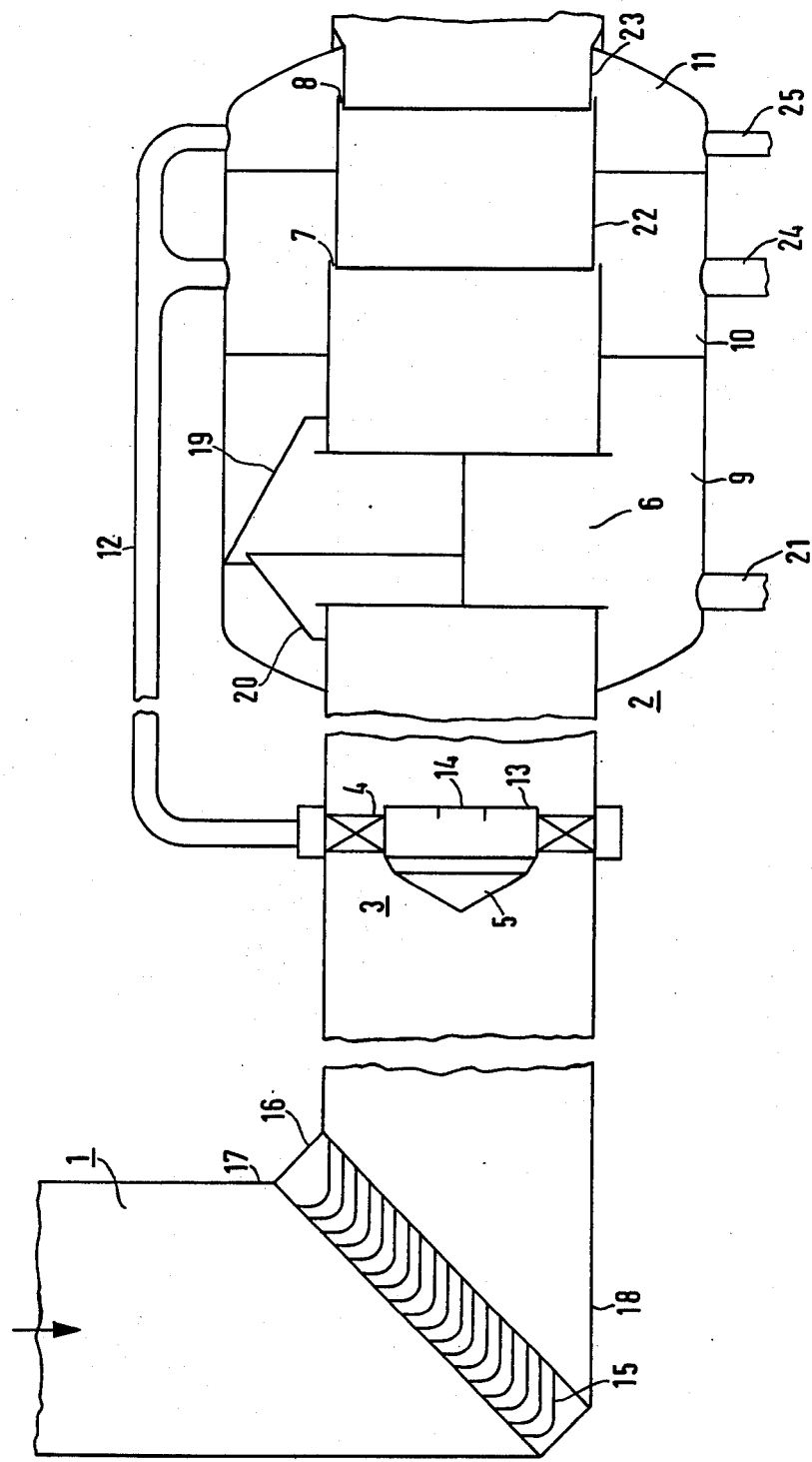

MEANS AND METHOD FOR SEPARATION OF WATER FROM STEAM-WATER MIXTURE

This invention relates to a device for separation of water from steam-water mixtures, especially in the connecting pipe between the high pressure and low pressure turbines of power generating plants comprising an axial flow turbine.

In wet steam turbines, as used in power plants, the water content of the steam, immediately after the high pressure unit of the turbine is so high that external water extractors have to be installed in the duct connecting the next turbine stage. In using such water extractors certain difficulties arise in eliminating the small vapor droplets which contain a substantial part of the water content of the vapor, with a permissible building cost and pressure losses.

It has been general practice up to now to build such water separators as separate units and to lead the steam-water mixture from the connecting pipe into said units. A separate unit for the water separator involves considerable additional construction cost and also causes undesirable pressure losses.

The invention provides a centrifugal generator, with a central streamlined body and radial guide blades installed directly in the connecting duct. The connecting duct behind the centrifugal torque generator has openings for the outlet of the expelled water into a water receiving chamber which concentrically surrounds the duct. From at least one of these water receiving chambers, a steam suction line leads to portions of lower pressure in the connecting duct. The water is first agglomerated and then spun out.

The primary object of the invention is to provide means and methods for the water separation from water-steam mixtures which require no additional space, which are easily accessible and which have a high separation efficiency with small pressure losses.

Another object is to provide a new and improved method of separating water from steam comprising the steps of agglomerating droplets of water and then spinning the water out of the steam by centrifugal force.

Another object of the invention is to provide new and improved means for separation of water from a steam-water mixture in the connecting duct between high pressure and low pressure axial flow turbines, comprising a spin generator having a central streamlined body, said spin generator being built directly into the connecting duct, the connecting duct having openings in its walls downstream from the spin generator for passage of the expelled water at least one water receiving chamber connected to said duct to receive said water and a steam suction pipe is connected from at least one receiving chambers to a zone of lower pressure in the connecting duct.

Other features which are considered as characteristic for the invention are set forth in the appended claims.

Although the invention is illustrated and described herein as embodied in a particular embodiment, it is nevertheless not intended to be limited to the details shown, since various modifications may be made therein without departing from the spirit of the invention and the scope and range of equivalents of the claims.

The construction and method of operation of the invention, however, together with additional objects and advantages thereof will be best understood from the following description when read in connection with the accompanying drawing, in which:

The drawing is a side view partly in section of an embodiment of the invention.

In the drawing, a connecting duct 1 of a saturated steam turbine is shown which leads to an intermediate superheater and to the low pressure unit of the saturated steam turbine. Because the steam which is exhausted from the high pressure unit has a high water content, it is necessary to separate the water before entry into the superheater, and the low pressure turbine.

According to the invention, a water extractor is directly built into the connecting duct 1. The extractor device 2 is a centrifugal torque generator 3 with radial guide blades 4 and a central streamlined body 5. The centrifugal generator has blades set to spin the water droplets off in centrifugal manner. A forced spin is given by said torque generator to the incoming water-steam mixture whereby the heavier water portions are thrown against the wall of the connecting duct. After the spin generator in the wall of the connecting duct 1, there are provided openings in the form of ring apertures 6 and ring slits 7 and 8. These openings lead into the water receiving chambers 9, 10 and 11, which chambers surround the connecting duct concentrically.

In the case of the example shown, each ring or ring slit has its own water receiving chamber. The main water extraction takes place in the first ring aperture 6 which is relatively wide and which can have widths up to half the duct diameter. The separation of the water by the first ring aperture 6 is caused mainly by the centrifugal force effect.

In order to avoid that the water which was expelled through ring aperture 6 will flow back again into the connecting duct, there are provided conical sheet metal baffle rings 19 and 20 which are located in the upper half of the surrounding water chamber 9, which rings are arranged in a roof-like configuration to each other. By means of these sheet metal rings 19 and 20, the expelled water is directed to the side and to the lower portion of chamber 9 where it is piped to the outside through drawing 21.

In contrast to this, the remaining water in the following narrow ring slits 7 and 8 which are formed by telescopic tube sections 22 and 23, is removed by an additional steam suction duct 12, which is connected to receiving chambers 10 and 11. This steam suction is connected from the chambers 10 and 11 by suction line 12, to a zone of lower pressure in the connecting duct 1. A zone of lower pressure exists in the center of the connecting duct behind the spin generator 3. For this reason, the suction duct 12 is connected by means of a few hollow guide blades 4 to the streamlined body 5 which is open on the down-stream side. The backside 13 of the body 5 can have an aperture 14 or be completely open. By means of the lower pressure in the center of the connecting duct, steam and water vapor is sucked off from the water receiving chambers 10 and 11 and also through the ring slits 7 and 8 from the main stream. This steam sucks water which runs as a film along the wall of the connecting duct 1, wall section 22, into chambers 10 and 11. From these chambers the water can be removed by drains 24 and 25.

In order to separate relatively fine water droplets from the steam flow, a high spin is required which causes pressure losses. To avoid this pressure loss it is preferable to bring to the spin generating device of the main extractor a steam of relatively large water drops. For this reason, it is preferable to install in the duct before the spin generator an agglomerator device in the form of input baffles 15 which conglomerate the small water droplets into larger drops.

In the conventional configuration of these agglomerators in a duct, there is additional space required. In contrast to this, the invention provides that the agglomerator is directly installed in form of baffles 15 which are orthogonal to the bending plane and parallel to each other, in the bend of the duct preceding the spin generator 3.

In order to maintain a sufficient flow cross section in the agglomerator, it must be greater than the cross section of the connecting duct 1. Therefore, the guide baffles 15 are built into an elliptical part 16 which forms the connection between the straight parts 17 and 18 of the elbow. The guide baffles 15 are angularly positioned in such a manner that they redirect the flow with small losses and also contribute to a more steady flow behind the elbow portion. At the same time, these guide baffles act as impact baffles for the incoming flow and cause agglomeration of even the smallest water droplets. It is advantageous to arrange the guide baffles as near as possible to each other whereby the smallest droplets in the flow would also be caught.

Since the agglomerator of said configuration is installed directly in the bend preceding the spin generator of the main extractor, a uniform inflow of the steam-water mixture with relatively large waterdrops is achieved without substantial pressure losses. The described separating device is shown with horizontal configuration but also can be used with a vertical configuration of the connecting duct. Because of the direct installation inside of the connecting duct, no additional separator unit is required. Consequently, the pressure which occurs at the separation, is held with narrow limits.

Any suitable centrifugal device to spin off the water particles may be employed. In the preferred embodiment, a rotating wheel similar to a turbine wheel is used and is provided with blades set to spin off the water droplets by centrifugal force.

Therefore, the present invention provides means and methods for a two stage water separation process. First the water vapor is agglomerated into larger droplets and secondly the droplets are spun out by centrifugal force.

It is claimed:

1. In combination, a high-pressure turbine stage, a low-pressure turbine stage, a duct having an inlet opening connected to said high-pressure turbine stage and an outlet opening connected to said low-pressure turbine stage, means for separating water from a steam-water mixture in said connecting duct, said means comprising a spin generator directly built into said connecting duct, said connecting duct being formed with at least one additional outlet opening downstream of said spin genertor in flow direction of said steam-water mixture for water centrifugally separated by said spin generator from said steam-water mixture, at least one water-receiving chamber surrounding said connecting duct in communication with said additional outlet opening, and a steam suction line connected at one end thereof to said water-receiving chamber and at another end thereof to said connecting duct in vicinity of said spin generator.

* * * * *